(12) United States Patent
Chandramouli et al.

(10) Patent No.: US 11,849,355 B2
(45) Date of Patent: Dec. 19, 2023

(54) HANDOVER OPTIMIZATION USING TIME SENSITIVE COMMUNICATION ASSISTANCE INFORMATION

(71) Applicant: NOKIA TECHNOLOGIES OY, Espoo (FI)

(72) Inventors: Devaki Chandramouli, Plano, TX (US); Colin Kahn, Morris Plains, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 268 days.

(21) Appl. No.: 17/474,844

(22) Filed: Sep. 14, 2021

(65) Prior Publication Data
US 2023/0080555 A1   Mar. 16, 2023

(51) Int. Cl.
*H04W 72/12*    (2023.01)
*H04W 48/02*    (2009.01)
*H04W 36/00*    (2009.01)

(52) U.S. Cl.
CPC ....... *H04W 36/0033* (2013.01); *H04W 48/02* (2013.01); *H04W 72/12* (2013.01)

(58) Field of Classification Search
CPC .............................. H04W 72/12; H04W 48/02
USPC ......................................................... 370/331
See application file for complete search history.

(56) References Cited

PUBLICATIONS

Bgpp TS 38.300 V16.6.0 (Jun. 2021), 3rd Generation Partnership Project; Technical Specification Group Radio Access Network; NR; NR and NG-RAN Overall Description; Stage 2 (Release 16), 152 pages.

*Primary Examiner* — Angel T Brockman
(74) *Attorney, Agent, or Firm* — SQUIRE PATTON BOGGS (US) LLP

(57) ABSTRACT

Systems, methods, apparatuses, and computer program products for handover optimization using time sensitive communication assistance information. The method may include, receiving, from a network element, a handover request message or a context message. At least one of the handover request message or the context message may include time sensitive communication assistance information. The method may also include at least one of performing an admission control procedure based on the time sensitive communication assistance information, and scheduling data transmission with a user equipment based on the time sensitive communication assistance information.

20 Claims, 7 Drawing Sheets

HANDOVER OPTIMIZATION USING TIME SENSITIVE COMMUNICATION ASSISTANCE INFORMATION

FIELD

Some example embodiments may generally relate to mobile or wireless telecommunication systems, such as Long Term Evolution (LTE) or fifth generation (5G) new radio (NR) access technology, or other communications systems. For example, certain example embodiments may relate to apparatuses, systems, and/or methods for handover (HO) optimization using time sensitive communication assistance information (TSCAI).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include receiving, from a network element, a handover request message or a context message. According to certain example embodiments, at least one of the handover request message or the context message may include time sensitive communication assistance information. The method may also include at least one of performing an admission control procedure based on the time sensitive communication assistance information, and scheduling data transmission with a user equipment based on the time sensitive communication assistance information.

Other example embodiments may be directed to an apparatus. The apparatus may include at least one processor and at least one memory including computer program code. The at least one memory and computer program code may also be configured to, with the at least one processor, cause the apparatus at least to receive, from a network element, a handover request message or a context message. According to certain example embodiments, at least one of the handover request message or the context message may include time sensitive communication assistance information. The apparatus may also be caused to perform at least one of performing an admission control procedure based on the time sensitive communication assistance information, and scheduling data transmission with a user equipment based on the time sensitive communication assistance information.

Other example embodiments may be directed to an apparatus. The apparatus may include means for receiving, from a network element, a handover request message or a context message. According to certain example embodiments, at least one of the handover request message or the context message may include time sensitive communication assistance information. The apparatus may also include means for performing at least one of performing an admission control procedure based on the time sensitive communication assistance information, and scheduling data transmission with a user equipment based on the time sensitive communication assistance information.

In accordance with other example embodiments, a non-transitory computer readable medium may be encoded with instructions that may, when executed in hardware, perform a method. The method may include receiving, from a network element, a handover request message or a context message. According to certain example embodiments, at least one of the handover request message or the context message may include time sensitive communication assistance information. The method may also include at least one of performing an admission control procedure based on the time sensitive communication assistance information, and scheduling data transmission with a user equipment based on the time sensitive communication assistance information.

Other example embodiments may be directed to a computer program product that performs a method. The method may include receiving, from a network element, a handover request message or a context message. According to certain example embodiments, at least one of the handover request message or the context message may include time sensitive communication assistance information. The method may also include at least one of performing an admission control procedure based on the time sensitive communication assistance information, and scheduling data transmission with a user equipment based on the time sensitive communication assistance information.

Other example embodiments may be directed to an apparatus that may include circuitry configured to receive, from a network element, a handover request message or a context message. According to certain example embodiments, at least one of the handover request message or the context message may include time sensitive communication assistance information. The apparatus may also include circuitry configured to perform at least one of performing an admission control procedure based on the time sensitive communication assistance information, and scheduling data transmission with a user equipment based on the time sensitive communication assistance information.

Some example embodiments may be directed to a method. The method may include transmitting, to a network element, a handover request message. According to certain example embodiments, the handover request message may include time sensitive communication assistance information. The method may also include receiving a handover request acknowledgment from the network element upon which data forwarding is initiated. The method may further include triggering handover of a user equipment to the network element based on the handover request acknowledgment by sending a reconfiguration message to the user equipment.

Other example embodiments may be directed to an apparatus. The apparatus may include at least one processor and at least one memory including computer program code. The at least one memory and computer program code may also be configured to, with the at least one processor, cause the apparatus at least to transmit, to a network element, a handover request message. According to certain example embodiments, the handover request message may include time sensitive communication assistance information. The apparatus may also be caused to receive a handover request acknowledgment from the network element upon which data forwarding is initiated. The apparatus may further be caused to trigger handover of a user equipment to the network element based on the handover request acknowledgment by sending a reconfiguration message to the user equipment.

Other example embodiments may be directed to an apparatus. The apparatus may include means for transmitting, to a network element, a handover request message. According to certain example embodiments, the handover request message may include time sensitive communication assistance information. The apparatus may also include means for receiving a handover request acknowledgment from the network element upon which data forwarding is initiated. The apparatus may further include means for triggering handover of a user equipment to the network element based on the handover request acknowledgment by sending a reconfiguration message to the user equipment.

In accordance with other example embodiments, a non-transitory computer readable medium may be encoded with instructions that may, when executed in hardware, perform a method. The method may include transmitting, to a network element, a handover request message. According to certain example embodiments, the handover request message may include time sensitive communication assistance information. The method may also include receiving a handover request acknowledgment from the network element upon which data forwarding is initiated. The method may further include triggering handover of a user equipment to the network element based on the handover request acknowledgment by sending a reconfiguration message to the user equipment.

Other example embodiments may be directed to a computer program product that performs a method. The method may include transmitting, to a network element, a handover request message. According to certain example embodiments, the handover request message may include time sensitive communication assistance information. The method may also include receiving a handover request acknowledgment from the network element upon which data forwarding is initiated. The method may further include triggering handover of a user equipment to the network element based on the handover request acknowledgment by sending a reconfiguration message to the user equipment.

Other example embodiments may be directed to an apparatus that may include circuitry configured to transmit, to a network element, a handover request message. According to certain example embodiments, the handover request message may include time sensitive communication assistance information. The apparatus may also include circuitry configured to receive a handover request acknowledgment from the network element upon which data forwarding is initiated. The apparatus may further include circuitry configured to trigger handover of a user equipment to the network element based on the handover request acknowledgment by sending a reconfiguration message to the user equipment.

BRIEF DESCRIPTION OF THE DRAWINGS

For proper understanding of example embodiments, reference should be made to the accompanying drawings, wherein.

DETAILED DESCRIPTION

Figure 1:
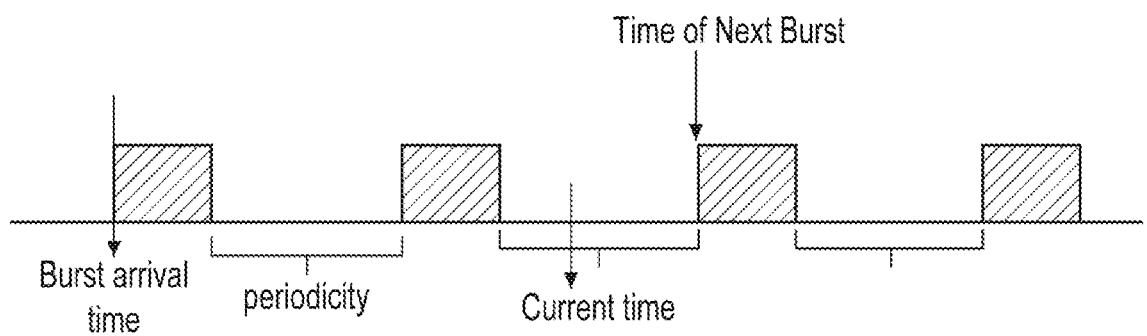
FIG. 1 illustrates an example transmission pattern, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for handover (HO) optimization using time sensitive communication assistance information (TSCAI).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments 5G system architecture specified in $3^{rd}$ Generation Partnership Project (3GPP) introduces TSCAI. Specifically, 3GPP introduces a 5G system (5GS) bridge that allows seamless integration of the 5GS into factory scenarios based on Institute of Electrical and Electronics Engineers (IEEE) time sensitive networking (TSN) capable Ethernet infrastructure. In this setup, the 5GS acts transparently as an Ethernet bridge within a TSN network. To optimize the 5GS radio access network (RAN) in such scenarios, periodic deterministic traffic pattern information provided via IEEE protocols to the 5GS bridge may be translated to TSCAI. The TSCAI may include burst arrival time (BAT) at the 5G air-interface, flow periodicity, and flow direction. Furthermore, a session management function (SMF) may send the TSCAI to the RAN (e.g., at packet data unit (PDU) session establishment), and the RAN may use the information to optimize scheduling and reduce latency over the 3GPP air interface. Additionally, the TSCAI may be used by the RAN for other purposes not proscribed by 3GPP. The capability has also been extended such that any application function (AF) that has knowledge of the traffic flow characteristics (not just the TSN-AF of 3GPP) can provide TSCAI related information to the 5GS.

Current mobility procedures do not consider quality of service (QoS) assistance information such as TSCAI including, for example, BAT and periodicity, as part of HO admission control and optimization of scheduling in a target gNB. This can be a disadvantage as traffic pattern information provided via TSCAI is not leveraged by the target gNB to determine when bursts are expected, and accordingly determine if the UE can be admitted. Additionally, the target gNB may be unable to optimize scheduling for UE(s) that are sending or receiving deterministic traffic streams for which TSCAI was provided to the source gNB.

Applications with deterministic traffic patterns such as IEEE TSN applications, generic TSC applications, and extended reality/augmented reality (XR/AR) applications may be able to provide traffic pattern information for downlink (DL) and/or uplink (UL), but this information is not available at HO at the target gNB.

FIG. 1 illustrates an example transmission pattern, according to certain example embodiments. In particular, FIG. 1 illustrates a transmission pattern that may include burst arrival time, periodicity, current time, and time of next burst, according to certain example embodiments. Certain example embodiments may include TSCAI as part of a HO request and context transfer to the target gNB, which may enable HO admission control and optimize scheduling. For instance, according to certain example embodiments, the source gNB may forward the TSCAI (including one or more of the BAT, flow periodicity, and flow direction) as part of the HO request or context transfer messages to the target gNB to enable HO admission control, and optimized scheduling at the target gNB. According to certain example embodiments, the flow periodicity may correspond to a periodicity of data flow between the UE and the source/target gNB. Further, the flow direction may correspond to the directional flow of data between the UE and the source/target gNB. That is, in some example embodiments, the flow periodicity is a periodicity of a data flow, and the flow direction is uplink when packets are sent by the UE, or downlink when sent by the gNB. In other example embodiments, the target gNB may calculate a time_of_next_burst. For example, the time_of_next_burst may be calculated as BAT+n*periodicity, where "n" is an integer such that time_of_next_burst is greater than a current time. As illustrated in FIG. 1, subsequent bursts may arrive at each periodicity. For instance, as an illustrative example, the integer in some example embodiments may be 6001. If BAT equals 1:00 AM (corresponding to an initial burst arrival time), periodicity equals 1 second, and the current time at the target gNB is 2:40 AM, the next burst would arrive at: time_of_next_burst=1:00+6001*1 seconds=2:40:01. Thus, from this example, it may be seen that the target gNB may select 6001 because it is the lowest integer such that time_of_next_burst>2:40.

In some example embodiments, the target gNB may assess, in admission control, whether it can configure semi-persistent scheduling (SPS) or configured grants accordingly. In certain example embodiments, if the HO is admitted, the target gNB may configure SPS or configured grants.

Figure 2:
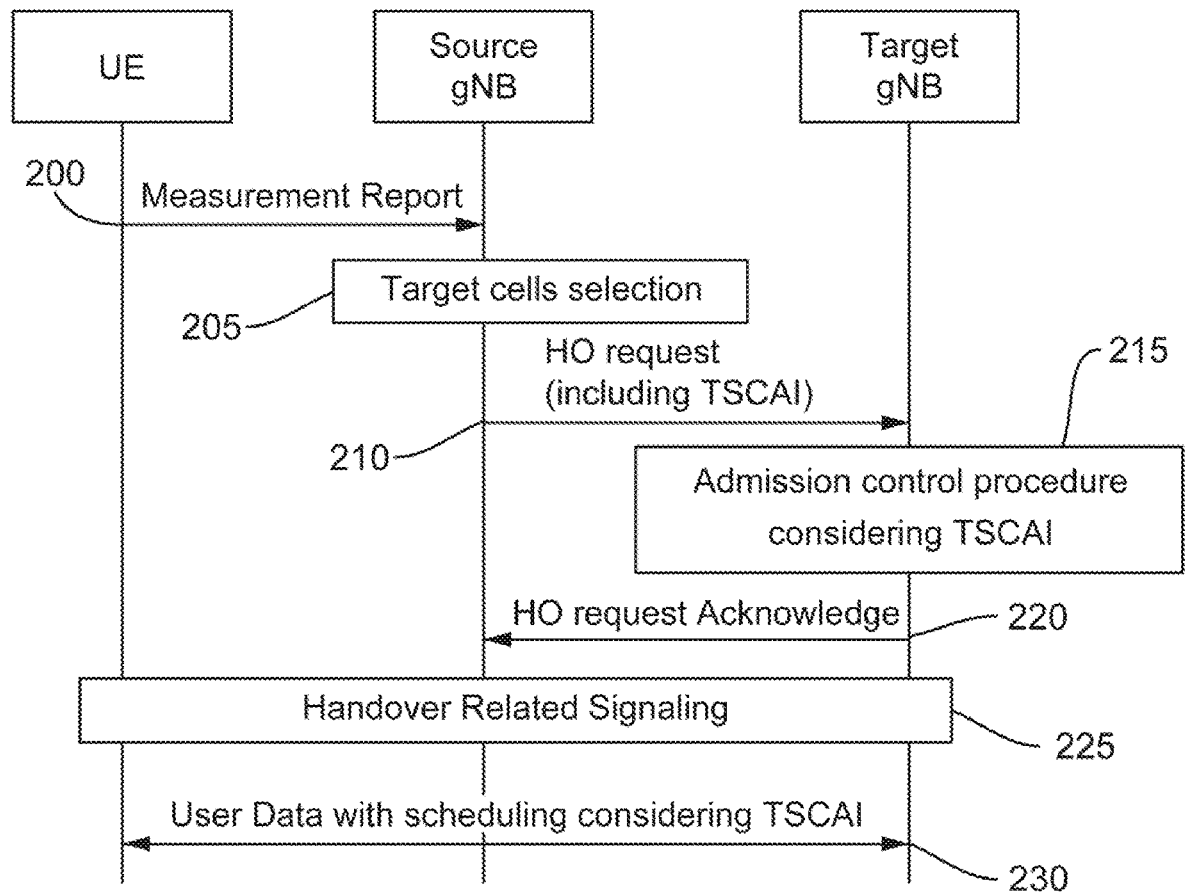
FIG. 2 illustrates an example signal diagram, according to certain example embodiments.

FIG. 2 illustrates an example signal diagram, according to certain example embodiments. In particular, FIG. 2 illustrates that TSCAI may be included during connected mode HO as part of the HO request. In other example embodiments, the TSCAI may be used for admission control and to optimize NG-RAN.

As illustrated in FIG. 2, at 200, the UE may transmit a measurement report to the source gNB. In certain example embodiments, the measurement report may include UE measurements or measurement results (e.g., power values) of multiple beams of a cell. The measurement report may also include a measurement identity of the associated measurement configuration that triggered the reporting. Additionally, cell and beam measurement quantities may be included in the measurement report, where the cell and beam measurement quantities may be configured by the network. At 205, the source gNB may decide to handover the UE to a target cell based on the measurement report, and select a target cell for the HO. At 210, the source gNB may issue a HO request message to the target gNB. According to certain example embodiments, the HO request message may include the TSCAI. At 215, the target gNB may perform admission control to determine whether the UE can be admitted. In certain example embodiments, the admission control procedure may consider the TSCAI, and a determination of whether the UE can be admitted may be based on the TSCAI among other factors.

At 220, the target gNB may prepare the HO by sending a HO request acknowledge (ACK) to the source gNB. According to certain example embodiments, when the source gNB receives the HO request ACK, or when the transmission of the handover command is initiated in the DL, data forwarding may be initiated. At 225, the source gNB may trigger the UE HO by sending an RRCReconfiguration message to the UE containing the information required to access the target cell. The information may include at least the target cell ID, the new cell radio network temporary identifier (C-RNTI), and/or the target gNB security algorithm identifiers for the selected security algorithms. At 230, the UE may synchronize to the target gNB, and complete the RRC HO procedure by sending RRCReconfigurationComplete message to the target gNB. After connecting to the target gNB, user data with scheduling that considers TSCAI may be exchanged between the UE and target gNB.

Figure 3:
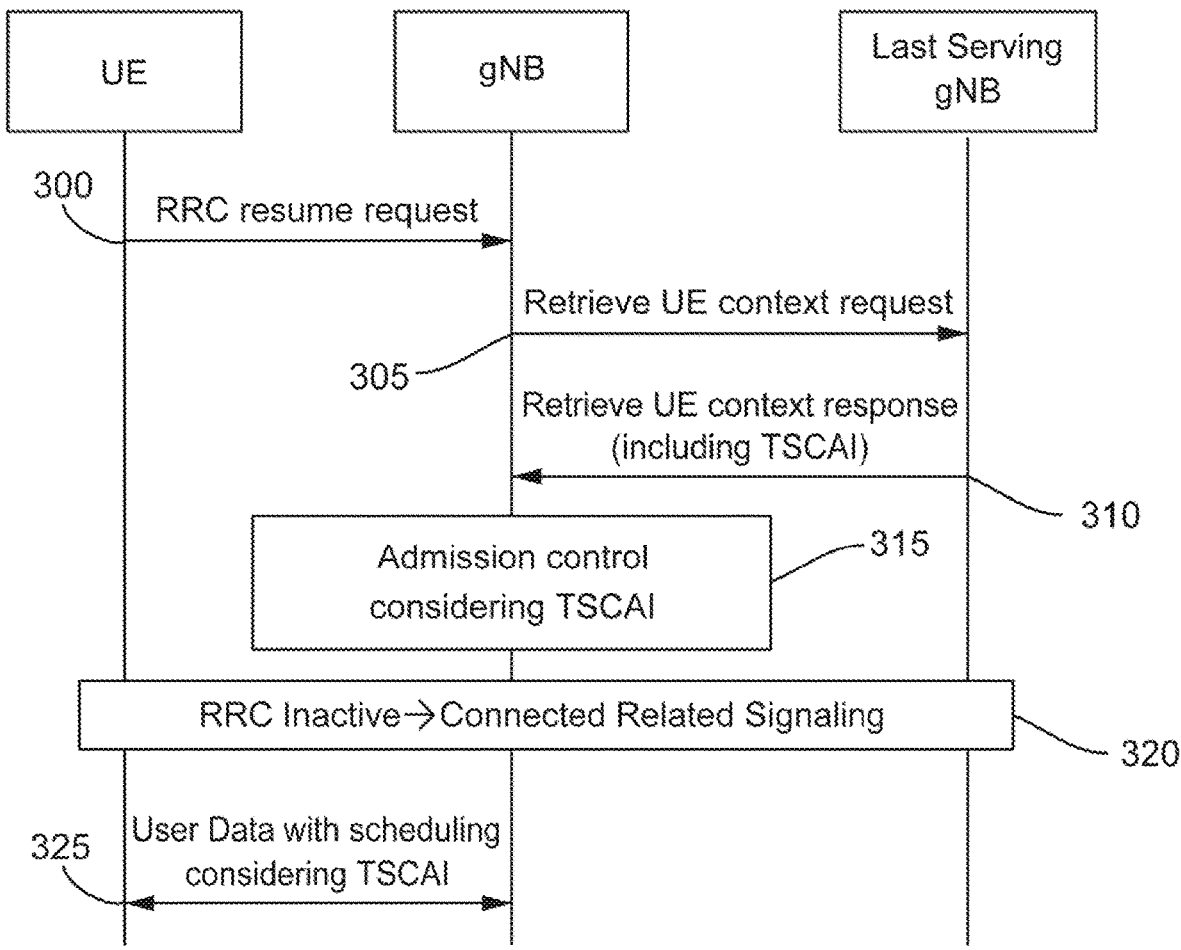
FIG. 3 illustrates an example of another signal diagram, according to certain example embodiments.

FIG. 3 illustrates an example of another signal diagram, according to certain example embodiments. In particular, FIG. 3 illustrates that the TSCAI may be included during RRC_Inactive to RRC_Connected transition as part of a context transfer.

At 300, the UE may transmit a RRC resume request to the gNB. According to certain example embodiments, the UE may resume from RRC_Inactive, providing an inactive radio network temporary identifier (I-RNTI), allocated by the last serving gNB. At 305, the gNB, if it is able to resolve the gNB identity contained in the I-RNTI, request the last serving gNB to provide UE context data. In some example embodiments, the UE context data may include PDU session context, the security key, UE radio capability and UE security capabilities, etc. At 310, the last serving gNB may provide UE context data to the gNB. In certain example embodiments, the UE context data may include TSCAI. At 315, the gNB may perform admission control, which may take into consideration the TSCAI received from the last serving gNB. According to certain example embodiments, the admission control procedure may consider the TSCAI, and a determination of whether the UE can be admitted may be based on the TSCAI among other factors. At 320, the UE may transition from RRC-Inactive to RRC_Connected, and RRC signaling may commence between the UE, gNB and last serving gNB. At 325, the UE may synchronize to the gNB, and user data with scheduling that considers TSCAI may be exchanged between the UE and the gNB.

Figure 4:
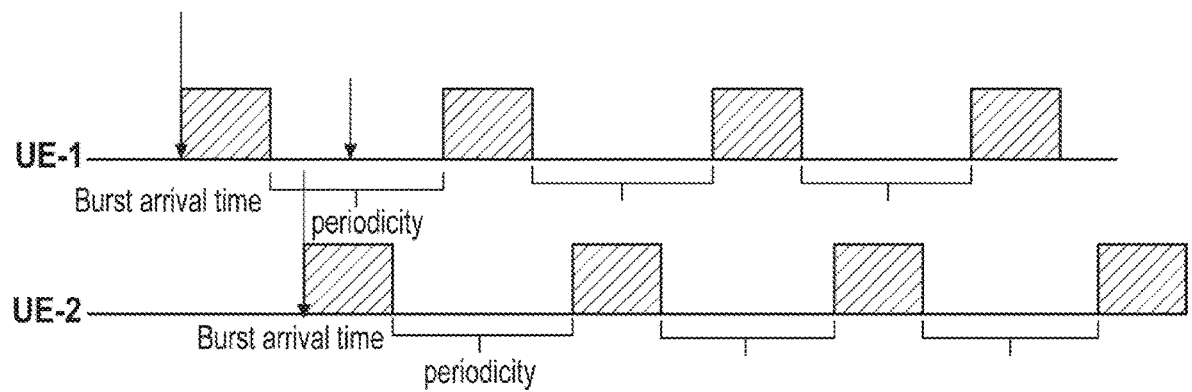
FIG. 4 illustrates an example of admission control, according to certain example embodiments.

FIG. 4 illustrates an example of admission control, according to certain example embodiments. In particular, FIG. 4 illustrates a scenario where the target gNB may use TSCAI in such a way that it is able to admit more UE(s) by considering their interleaved traffic pattern. As illustrated in FIG. 4, a traffic pattern is shown for UE-1 and UE-2, which may include a burst arrival time and periodicity. During admission control, the target gNB may evaluate whether a candidate UE (eg: UE-2) has a traffic pattern that conflicts with that of another UE (eg: UE-1) that is already receiving service on the target gNB. The target gNB may hence determine whether UE-2 should be admitted to receive service on the target gNB. Alternatively, the target gNB may consider the traffic patterns of UE-1 and UE-2 and adjust transmission scheduling of UE-1 and/or UE-2 to avoid conflicts.

Figure 5:
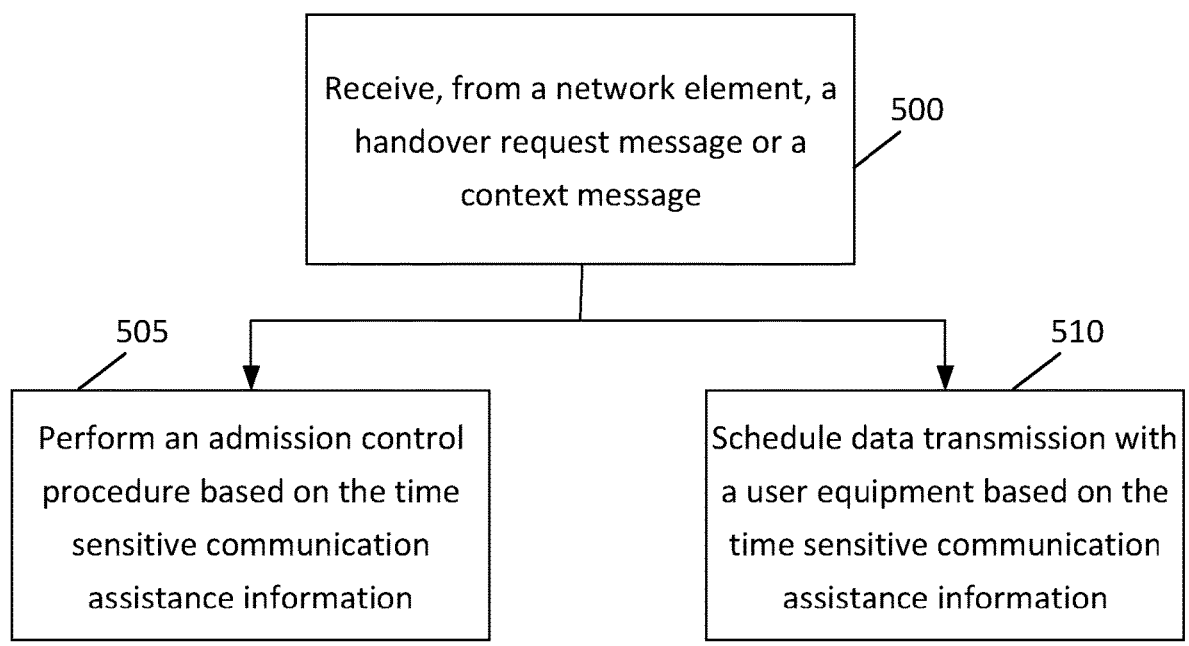
FIG. 5 illustrates an example flow diagram of a method, according to certain example embodiments.

FIG. 5 illustrates an example flow of a method, according to certain example embodiments. In an example embodiment, the method of FIG. 5 may be performed by a network entity, or a group of multiple network elements in a 3GPP system, such as LTE or 5G-NR. For instance, in an example embodiment, the method of FIG. 5 may be performed by a gNB, a target gNB, or a combination of the gNB and target gNB similar to one of apparatuses 10 or 20 illustrated in FIGS. 7(a) and 7(b).

According to certain example embodiments, the method of FIG. 5 may include, at 500, receiving, from a network element, a handover request message or a context message. In an embodiment, the handover request message and/or the context message may include time sensitive communication assistance information. At 505, the method may also include performing an admission control procedure based on the time sensitive communication assistance information. At 510, the method may further include scheduling data transmission with a user equipment based on the time sensitive communication assistance information. In certain example embodiments, at least one of operation 505 and operation 510 may be performed (i.e., it is not required for both operation 505 and operation 510 to be performed).

According to certain example embodiments, the time sensitive communication assistance information may include a current burst arrival time, a flow periodicity, and a flow direction. According to other example embodiments, the method may also include calculating a future burst arrival time based on the current burst arrival time, an integer, and the flow periodicity. According to some example embodiments, the admission control procedure may include a determination of whether semi-persistent scheduling or configured grants can be configured based on the time sensitive communication assistance information. In certain example embodiments, when handover is admitted, the method may further include configuring the semi-persistent scheduling or the configured grants.

Figure 6:
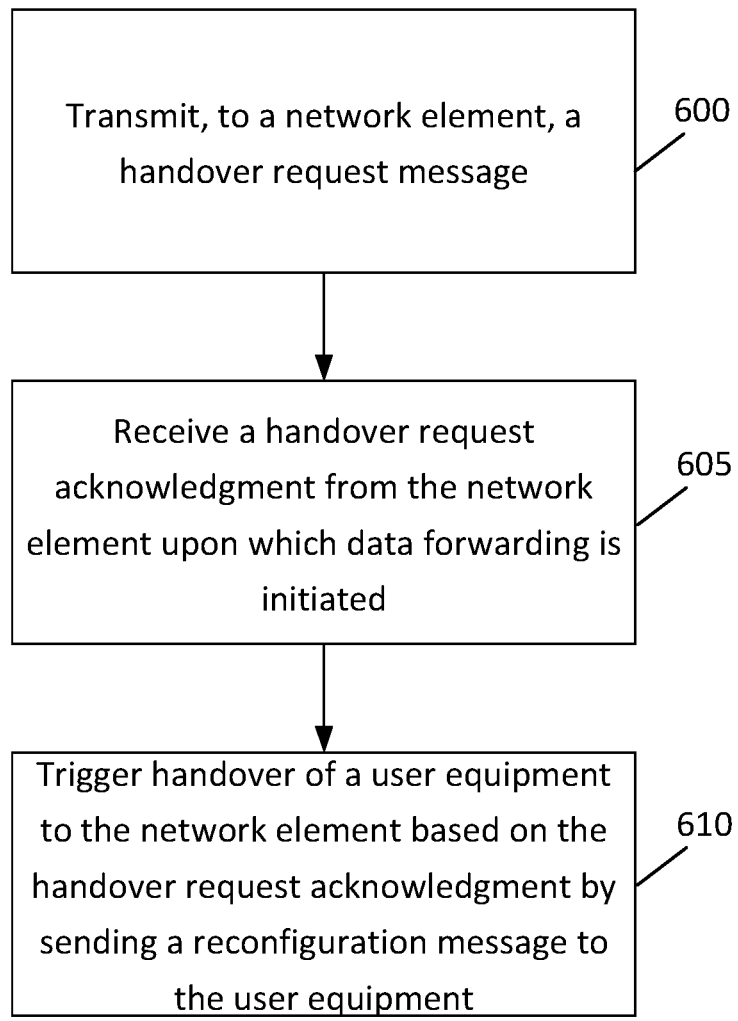
FIG. 6 illustrates an example flow diagram of another method, according to certain example embodiments.

FIG. 6 illustrates an example flow of another method, according to certain example embodiments. In an example embodiment, the method of FIG. 6 may be performed by a network entity, or a group of multiple network elements in a 3GPP system, such as LTE or 5G-NR. For instance, in an example embodiment, the method of FIG. 6 may be performed by a gNB such as a source gNB similar to one of apparatuses 10 or 20 illustrated in FIGS. 7(a) and 7(b).

According to certain example embodiments, the method of FIG. 6 may include, at 600, transmitting, to a network element, a handover request message. According to certain example embodiments, the handover request message may include time sensitive communication assistance information. At 605, the method may include receiving a handover request acknowledgment from the network element upon which data forwarding is initiated. At 610, the method may include triggering handover of a user equipment to the network element based on the handover request acknowledgment by sending a reconfiguration message to the user equipment. According to certain example embodiments, the time sensitive communication assistance information may include a current burst arrival time, a flow periodicity, and a flow direction.

Figure 7A:
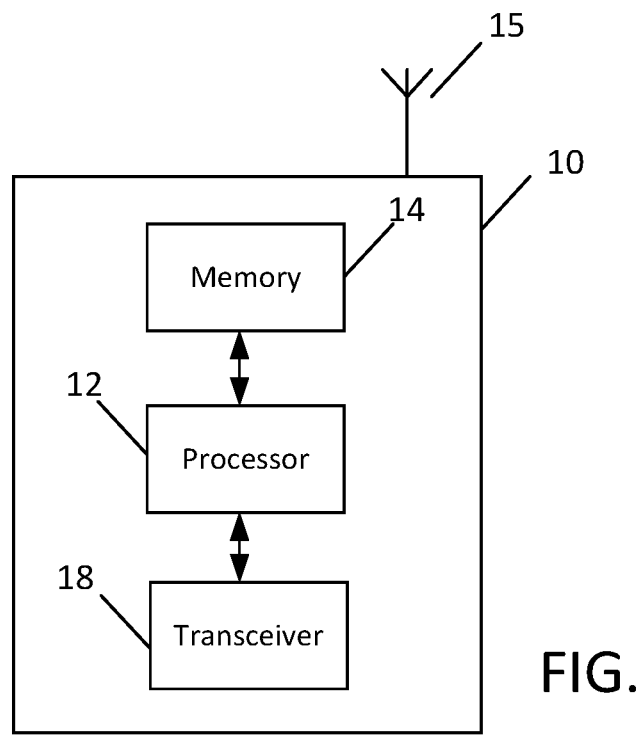
FIG. 7(a) illustrates an apparatus, according to certain example embodiments.

FIG. 7(a) illustrates an apparatus 10 according to certain example embodiments. In certain example embodiments, apparatus 10 may be a node or element in a communications network or associated with such a network, such as a UE, mobile station, mobile device, stationary device, or other device. It should be noted that one of ordinary skill in the art would understand that apparatus 10 may include components or features not shown in FIG. 7(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 7(a).

As illustrated in the example of FIG. 7(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

Figure 7B:
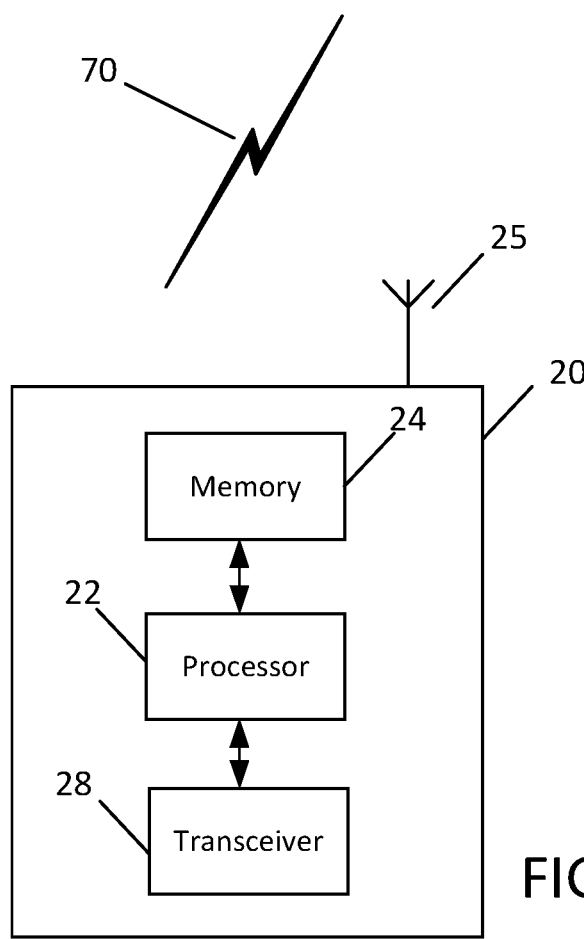
FIG. 7(b) illustrates another apparatus, according to certain example embodiments.

FIG. 7(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 7(b).

As illustrated in the example of FIG. 7(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In certain example embodiments, apparatus 20 may be controlled by memory 24 and processor 22 to receive, from a network element, a handover request message or a context message, wherein the handover request message and the context message each comprises time sensitive communication assistance information. Apparatus 20 may also be controlled by memory 24 and processor 22 to perform at least one of performing an admission control procedure based on the time sensitive communication assistance information, and scheduling data transmission with a user equipment based on the time sensitive communication assistance information.

In other example embodiments, apparatus 20 may be controlled by memory 24 and processor 22 to transmit, to a network element, a handover request message. According to certain example embodiments, the handover request message may include time sensitive communication assistance information. Apparatus 20 may also be controlled by memory 24 and processor 22 to receive a handover request acknowledgment from the network element upon which data forwarding is initiated. Apparatus 20 may further be controlled by memory 24 and processor 22 to trigger handover of a user equipment to the network element based on the handover request acknowledgment by sending a reconfiguration message to the user equipment.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may further be directed to an apparatus that includes means for performing any of the methods described herein including, for example, means for receiving, from a network element, a handover request message or a context message, wherein the handover request message and the context message each comprises time sensitive communication assistance information. The apparatus may also include means for performing at least one of performing an admission control procedure based on the time sensitive communication assistance information, and scheduling data transmission with a user equipment based on the time sensitive communication assistance information.

Certain example embodiments may further be directed to an apparatus that includes means for transmitting, to a network element, a handover request message. According to certain example embodiments, the handover request message may include time sensitive communication assistance information. The apparatus may also include means for receiving a handover request acknowledgment from the network element upon which data forwarding is initiated. The apparatus may further include means for triggering handover of a user equipment to the network element based on the handover request acknowledgment by sending a reconfiguration message to the user equipment.

Certain example embodiments described herein provide several technical improvements, enhancements, and/or advantages. In some example embodiments, it may be possible to provide TSCAI as part of an HO request and context transfer to a target gNB to enable HO admission control and optimized scheduling. It may also be possible to improve HO procedures for deterministic applications, enable the target gNB to be aware of that TSC is needed when performing admission control, and make TSCAI information available for optimizing scheduling. According to other example embodiments, it may be possible to optimize scheduling from using TSCAI, which can provide lower 5GS delay and higher capacity for TSC. Furthermore, admission control using TSCAI can avoid overload conditions where TSC QoS requirements cannot be satisfied.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G 5th Generation
5GCN 5G Core Network
5GS 5G System
AF Application Function
AR Augmented Reality
BAT Burst Arrival Time
BS Base Station
DL Downlink
eNB Enhanced Node B
gNB 5G or Next Generation NodeB
HO Handover
LTE Long Term Evolution
NEF Network Exposure Framework
NG-RAN Next Generation Radio Access Network
NR New Radio
PCF Policy Control Function
PDU Protocol Data Unit
RRC Radio Resource Control
TSC Time Sensitive Communication
TSCAI TSC Assistance Information
TSN Time Sensitive Networking
UE User Equipment
UL Uplink
URSP UE Route Selection Policies
XR Extended Reality

We claim:

1. An apparatus, comprising:
   at least one processor; and
   at least one memory comprising computer program code,
   the at least one memory and the computer program code are configured, with the at least one processor, to cause the apparatus at least to
   receive, from a network element, a handover request message or a context message, wherein at least one of the handover request message or the context message comprises time sensitive communication assistance information; and at least one of
   perform an admission control procedure based on the time sensitive communication assistance information; and
   schedule data transmission with a user equipment based on the time sensitive communication assistance information.

2. The apparatus according to claim 1, wherein the time sensitive communication assistance information comprises:
   a current burst arrival time;
   a flow periodicity; and
   a flow direction.

3. The apparatus according to claim 2, wherein the at least one memory and the computer program code are further configured, with the at least one processor, to cause the apparatus at least to:
   calculate a future burst arrival time based on the current burst arrival time, an integer, and the flow periodicity.

4. The apparatus according to claim 1, wherein the admission control procedure comprises a determination of whether semi-persistent scheduling or configured grants can be configured based on the time sensitive communication assistance information.

5. The apparatus according to claim 1, wherein the handover request message is received from a source network element.

6. The apparatus according to claim 4, wherein when handover is admitted, the at least one memory and the computer program code are further configured, with the at least one processor, to cause the apparatus at least to:
   configure the semi-persistent scheduling or the configured grants.

7. A method, comprising:
   receiving, from a network element, a handover request message or a context message, wherein at least one of the handover request message or the context message comprises time sensitive communication assistance information; and at least one of
   performing an admission control procedure based on the time sensitive communication assistance information; and
   scheduling data transmission with a user equipment based on the time sensitive communication assistance information.

8. The method according to claim 7, wherein the time sensitive communication assistance information comprises:
   a current burst arrival time;
   a flow periodicity; and
   a flow direction.

9. The method according to claim 8, further comprising:
   calculating a future burst arrival time based on the current burst arrival time, an integer, and the flow periodicity.

10. The method according to claim 7, wherein the admission control procedure comprises a determination of whether semi-persistent scheduling or configured grants can be configured based on the time sensitive communication assistance information.

11. The method according to claim 7, wherein the handover request message is received from a source network element.

12. The method according to claim 10, wherein when handover is admitted, the method further comprises:
configuring the semi-persistent scheduling or the configured grants.

13. A computer program, embodied on a non-transitory computer readable medium, the computer program comprising computer executable code, which, when executed by a processor, causes the processor to:
receive, from a network element, a handover request message or a context message, wherein at least one of the handover request message or the context message comprises time sensitive communication assistance information; and at least one of
perform an admission control procedure based on the time sensitive communication assistance information; and
schedule data transmission with a user equipment based on the time sensitive communication assistance information.

14. The computer program according to claim 13, wherein the time sensitive communication assistance information comprises:
a current burst arrival time;
a flow periodicity; and
a flow direction.

15. The computer program according to claim 14, wherein the computer program comprises computer executable code, which, when executed by the processor, further causes the processor to:
calculate a future burst arrival time based on the current burst arrival time, an integer, and the flow periodicity.

16. The computer program according to claim 13, wherein the admission control procedure comprises a determination of whether semi-persistent scheduling or configured grants can be configured based on the time sensitive communication assistance information.

17. The computer program according to claim 13, wherein the handover request message is received from a source network element.

18. The computer program according to claim 16, wherein when handover is admitted, the computer program comprises computer executable code, which, when executed by the processor, further causes the processor to:
configure the semi-persistent scheduling or the configured grants.

19. An apparatus, comprising:
at least one processor; and
at least one memory comprising computer program code,
the at least one memory and the computer program code are configured, with the at least one processor, to cause the apparatus at least to
transmit, to a network element, a handover request message, wherein the handover request message comprises time sensitive communication assistance information;
receive a handover request acknowledgment from the network element upon which data forwarding is initiated; and
trigger handover of a user equipment to the network element based on the handover request acknowledgment by sending a reconfiguration message to the user equipment.

20. The apparatus according to claim 19, wherein the time sensitive communication assistance information comprises:
a current burst arrival time;
a flow periodicity; and
a flow direction.

* * * * *